C. J. EDINGER.
CULINARY UTENSIL.
APPLICATION FILED NOV. 17, 1908.
915,574.
Patented Mar. 16, 1909.
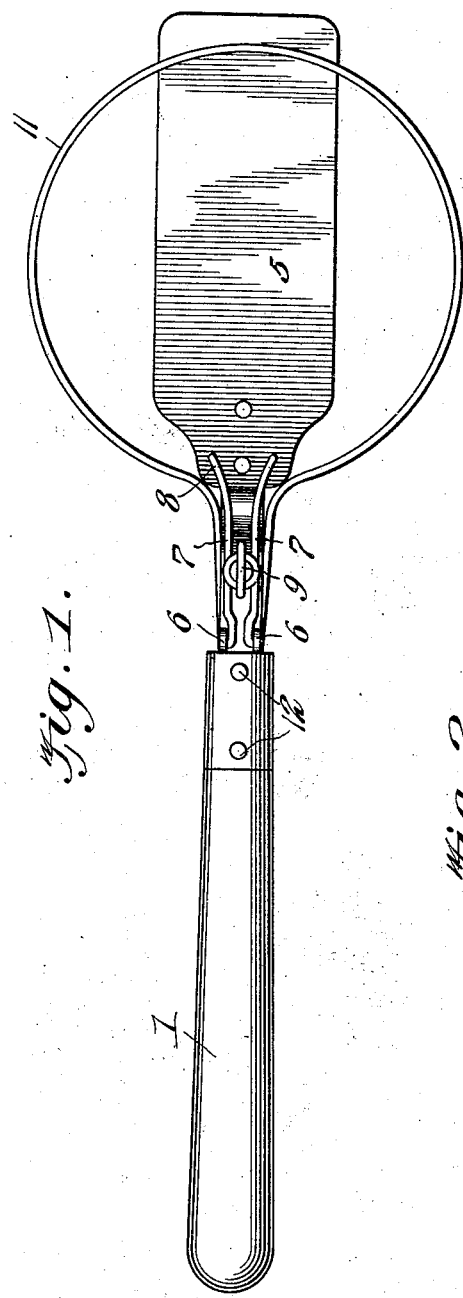
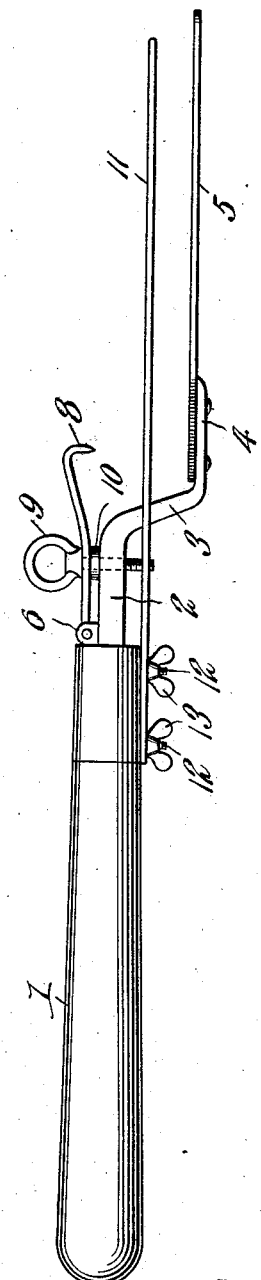
Fig. 1.
Fig. 2.
Witnesses
Frank B. Hoffman
C. C. Hines
Inventor
Catharine J. Edinger
By Victor J. Evans
Attorney

UNITED STATES PATENT OFFICE.

CATHARINE J. EDINGER, OF ST. PETERSBURG, PENNSYLVANIA, ASSIGNOR OF ONE-FOURTH TO LILIAN SHANE AND ONE-FOURTH TO LULA SHANE, OF LEECHBURG, PENNSYLVANIA.

CULINARY UTENSIL.

No. 915,574.    Specification of Letters Patent.    Patented March 16, 1909.

Application filed November 17, 1908. Serial No. 463,103.

*To all whom it may concern:*

Be it known that I, CATHARINE J. EDINGER, a citizen of the United States, residing at St. Petersburg, in the county of Clarion and State of Pennsylvania, have invented new and useful Improvements in Culinary Utensils, of which the following is a specification.

This invention relates to an improved culinary utensil designed for use as a combination implement for several purposes, such as a bread or cake lifter or turner, a pan lifter, or a pie-plate lifter, whereby cakes, biscuits or the like may be turned in or removed from a pan or griddle, or a hot pan or vessel or a pie plate removed from the stove or oven, etc., without liability of burning the hands of the cook or person performing the culinary operation.

The object of the invention is to provide a simple, effective and inexpensive construction of device for these several purposes.

The invention consists of the features of construction, combination and arrangement of parts hereinafter fully described and claimed, reference being had to the accompanying drawing, in which:—

Figure 1 is a top plan view of a culinary vessel embodying my invention, with the retaining ring in position. Fig. 2 is a side elevation of the same.

Referring to the drawing, my improved culinary utensil comprises a suitable handle 1, from the forward end of which projects a shank 2 having a downwardly and forwardly extending portion 3 and a forwardly projecting free end portion 4, the latter being arranged in a plane parallel with the handle and body of the shank. Secured to the portion 4 at its rear end is a lifting plate or blade 5, made of sheet metal, which is thus disposed in a plane below and parallel with the shank for effective use. It will be understood that the device as thus constructed may be employed as a cake or biscuit turner or blade for separating pies from pans, and for performing other analogous culinary operations.

The shank 2 is provided with a pair of upwardly extending spaced ears 6, which are perforated to form bearings for the laterally bent journals or free ends of a pair of pan engaging members 7, said members extending forwardly in parallel relation beyond the front end of the body portion of the shank and having their forward ends bent upwardly at an angle and terminating in downturned hooks 8 arranged above the rear end of the blade or plate 5, such hooks being adapted to engage the rim edge of the wall of a pan supported upon the plate, whereby the pan may be securely held while it is being lifted or being applied to or removed from a stove or oven. The shank is formed in advance of the ears with a threaded opening to receive the screw shank of an adjusting and clamping screw 9, said screw having a head 10 formed in its sides with an annular groove or recess receiving the adjacent portions of the engaging members 7, by which the latter are connected therewith. By means of this screw the said engaging members may be adjusted vertically to dispose their hooks 8 at a greater or less elevation relative to the blade or plate 5 to engage the edges of vessels which vary in depth, the engaging members swinging on their pivotal supports. The inclusion of these engaging members 7 adapts the device for engaging and lifting pots or pans which cannot be securely held upon the blade alone, as will be readily understood.

In order to adapt the device for engaging and holding shallow pans, or plates, such as pie plates, for the purpose of lifting and handling hot plates of this character, a split retaining ring or band 11 is employed and which is disposed above the blade or plate 5. The ends of this ring or band extend rearwardly on opposite sides of and beyond the portion 3 of the shank and are perforated for the reception of screws 12 mounted on the handle, and to which are applied thumb nuts 13, by which the ends of the rim may be securely clamped to the handle. When the device is employed as a cake turner or lifter for comparatively deep vessels, the retaining band or ring is removed in an obvious manner, although the band need not be removed if the vessel is of sufficiently small diameter to fit within the ring. When the device is to be employed for handling pie plates and other shallow utensils of like character, the band is fitted in position and incloses the plate, thus preventing it from shifting out of engagement with the blade or plate 5 while being lifted or transported.

From the foregoing description, the construction and mode of use of my improved culinary utensil will be readily understood, and it will be seen that it provides a device for the purposes stated which is simple of construction, efficient in use and may be manufactured and sold at a comparatively low cost.

Having thus fully described the invention, what is claimed as new is:—

1. A device of the character described, comprising a handle, a blade carried by the handle, engaging hooks pivotally mounted upon the handle and having their engaging portions overhanging the rear end of the blade, and an adjusting screw mounted on the handle and engaging said hooks for adjusting and securing the same in adjusted position.

2. A device of the character described, comprising a handle having a shank provided with a downwardly and forwardly projecting portion, a blade carried by said downwardly and forwardly projecting portion, engaging hooks pivotally mounted at their rear ends upon the body of the shank and having hooked ends overhanging the rear end of the blade, and an adjusting screw upon the shank engaging said engaging hooks for adjusting and securing the same in adjusted position.

3. A device of the character described, comprising a handle having a shank provided with a downwardly and forwardly extending portion, a blade carried by said downwardly and forwardly extending portion, hooked engaging members pivotally mounted upon the shank, and an adjusting screw mounted upon the shank and having an annular recess receiving said engaging members, whereby the latter are adapted to be adjusted and secured in adjusted position by said screw.

4. A device of the character described, comprising a handle, a lifting blade carried thereby, adjustably mounted engaging hooks supported by the handle and projecting over the rear portion of the blade, and an engaging ring or band overlying the blade and detachably connected to the handle.

5. A device of the character described, comprising a handle, a shank extending therefrom, a lifting blade carried by the shank, adjustably mounted engaging hooks carried by the shank, and an engaging ring or band overlying the blade and detachably connected to the handle.

6. A device of the character described comprising a handle having a downwardly and forwardly bent portion, a lifting blade below the handle, engaging hooks pivotally mounted upon the handle above the rear end of the blade, means for adjusting and securing said hooks in adjusted position, and an engaging ring or band overlying the blade and detachably connected with the handle.

In testimony whereof I affix my signature in presence of two witnesses.

CATHARINE J. EDINGER.

Witnesses:
 VERDA EDINGER,
 MILLIE BUCK.